United States Patent
Irrgang et al.

(10) Patent No.: US 9,970,683 B2
(45) Date of Patent: May 15, 2018

(54) APPARATUS AND METHOD FOR FLAMELESS THERMAL OXIDATION AT OPTIMIZED EQUIVALENCE RATIOS

(71) Applicant: Linde Engineering North America Inc., Blue Bell, PA (US)

(72) Inventors: Gene H. Irrgang, Horsham, PA (US); Peter Falcone, Media, PA (US)

(73) Assignee: LINDE ENGINEERING NORTH AMERICA INC., Blue Bell, PA (US)

( * ) Notice: Subject to any disclaimer, the term of this patent is extended or adjusted under 35 U.S.C. 154(b) by 771 days.

(21) Appl. No.: 14/298,019

(22) Filed: Jun. 6, 2014

(65) Prior Publication Data

US 2014/0283812 A1    Sep. 25, 2014

Related U.S. Application Data

(63) Continuation-in-part of application No. 12/921,481, filed as application No. PCT/US2009/036724 on Mar. 11, 2009, now abandoned.

(60) Provisional application No. 61/035,589, filed on Mar. 11, 2008.

(51) Int. Cl.
  *C10J 1/20*    (2006.01)
  *F24J 1/00*    (2006.01)
  *F23C 99/00*   (2006.01)
  *F23G 7/06*    (2006.01)

(52) U.S. Cl.
  CPC .............. *F24J 1/00* (2013.01); *F23C 99/006* (2013.01); *F23G 7/065* (2013.01); *Y02E 20/342* (2013.01)

(58) Field of Classification Search
  CPC ................................ F23C 99/006; F23C 13/00

USPC ...................................... 126/263.01; 431/170
See application file for complete search history.

(56) References Cited

U.S. PATENT DOCUMENTS

| 3,633,887 A | 1/1972 | Bechthold et al. |
| 3,892,538 A | 7/1975 | Seth |
| 4,018,553 A * | 4/1977 | Baker ..................... F23D 14/18 |
| | | 126/215 |

(Continued)

FOREIGN PATENT DOCUMENTS

| FR | 2870925 A1 | 12/2005 |
| GB | 2118454 A | 11/1983 |

(Continued)

OTHER PUBLICATIONS

International Search Report, dated Nov. 27, 2009, corresponding to International Patent Application No. PCT/US2009/036724.

(Continued)

*Primary Examiner* — Avinash Savani
*Assistant Examiner* — Aaron Heyamoto
(74) *Attorney, Agent, or Firm* — RatnerPrestia

(57) ABSTRACT

A diptube apparatus for a flameless thermal oxidizer having a matrix bed of media including a vent gas stream conduit at least partially positioned within the matrix bed for delivering a vent gas stream; an oxidizing agent conduit separate from the vent gas stream conduit and at least partially positioned within the matrix bed for delivering oxidizing agents; and at least one mixing conduit positioned within the matrix bed and configured to receive the vent gas stream and the oxidizing agents to deliver a combination of the vent gas stream and the oxidizing agents into the matrix bed. A related method and flameless thermal oxidizer are also provided.

16 Claims, 6 Drawing Sheets

(56) References Cited

U.S. PATENT DOCUMENTS

| | | | |
|---|---|---|---|
| 4,148,437 A | | 4/1979 | Barker |
| 4,293,298 A | * | 10/1981 | Bergkvist ............... B01J 8/1827 239/434 |
| 4,400,150 A | * | 8/1983 | Smith .................... B01J 8/1818 110/245 |
| 4,460,330 A | * | 7/1984 | Asai ....................... B01J 8/1827 110/263 |
| 5,372,791 A | * | 12/1994 | Abdulally ............. B01J 8/1818 239/86 |
| 6,015,540 A | | 1/2000 | McAdams et al. |
| 6,088,934 A | | 7/2000 | Newton |
| 7,704,070 B2 | | 4/2010 | Veenstra |
| 8,221,512 B2 | | 7/2012 | Fujioka et al. |
| 8,602,095 B2 | | 12/2013 | Zubrin et al. |
| 2003/0089038 A1 | * | 5/2003 | Weaver .................... C10J 3/466 48/210 |
| 2003/0096204 A1 | * | 5/2003 | Hermann ................ F23C 13/00 431/7 |
| 2004/0106837 A1 | | 6/2004 | Lampert |
| 2006/0248800 A1 | | 2/2006 | Miglin et al. |
| 2006/0183064 A1 | | 8/2006 | Rost et al. |
| 2009/0035709 A1 | | 2/2009 | Mennie et al. |
| 2009/0136406 A1 | | 5/2009 | Johnson et al. |
| 2009/0227826 A1 | | 9/2009 | Rost et al. |
| 2011/0283991 A1 | | 11/2011 | Falcone |

FOREIGN PATENT DOCUMENTS

| | | |
|---|---|---|
| WO | WO 95/34349 | 12/1995 |
| WO | WO 2007118950 A1 | 10/2007 |

OTHER PUBLICATIONS

U.S. Office Action, dated Dec. 11, 2013, corresponding to counterpart U.S. Appl. No. 12/921,481.

U.S. Office Action, dated Feb. 12, 2014, corresponding to counterpart U.S. Appl. No. 12/921,481.

* cited by examiner

APPARATUS AND METHOD FOR FLAMELESS THERMAL OXIDATION AT OPTIMIZED EQUIVALENCE RATIOS

CROSS-REFERENCE TO RELATED APPLICATIONS

This application is a continuation-in-part patent application of U.S. application Ser. No. 12/921,481 filed Apr. 28, 2011, which is the U.S. national phase application of PCT International Application No. PCT/US2009/036724, filed Mar. 11, 2009, which claims priority to U.S. Provisional Patent Application No. 61/035,589, filed on Mar. 11, 2008, the contents of such applications being incorporated by reference herein.

BACKGROUND OF THE INVENTION

The present invention relates to a flameless thermal oxidizer configured for flameless thermal oxidation at optimized equivalence ratios, and a method of flameless thermal oxidation at optimized equivalence ratios.

Many industries, such as the chemical, pharmaceutical, oil refinery, power utility, and electronic industry react chemicals at high temperatures, for example about 1000 degrees Fahrenheit. The terms "react" or "reaction" refer to any endothermic or exothermic chemical reaction, such as the vaporization, synthesis, oxidation, or reduction of a chemical. Chemicals and fume streams may be safely destroyed through oxidation. Thermal oxidation is a process whereby solvents and other hydrocarbons combine with oxygen to form water and carbon dioxide. The products of reaction from the original mixture of solvents/hydrocarbons can thereafter be safely discharged to the atmosphere.

One type of apparatus that can be used to facilitate thermal oxidation is a flameless thermal oxidizer (FTO). The reaction is referred to as 'flameless' because the FTO permits the reaction of the process gas stream to occur in the absence of a flame. The flameless thermal oxidizer may be utilized, for example, to treat organic vent gases released from organic synthesis reactors and similar hydrocarbon off-gas control applications. Flameless thermal oxidizers are described, for example, in U.S. Pat. No. 6,015,540 to McAdams et al., which is incorporated herein by reference in its entirety.

In the interests of efficiency and/or safety, there exists a need to further develop and improve FTO's to facilitate a substantially complete oxidation reaction of a fume stream with reduced risk of flashback, while reducing operational costs and/or improving the available capacity of the vessel.

SUMMARY OF THE INVENTION

According to one aspect of the invention, a diptube apparatus for a flameless thermal oxidizer having a matrix bed of media is provided. The diptube apparatus comprises a vent gas stream conduit at least partially positioned within the matrix bed for delivering the vent gas stream. An oxidizing agent conduit is at least partially positioned within the matrix bed for delivering oxidizing agents. The oxidizing agent conduit is separate from the vent gas stream conduit. At least one mixing conduit is positioned within the matrix bed and configured to receive vent gas stream from the vent gas stream conduit and the oxidizing agent from the oxidizing agent conduit. The mixing conduit is positioned to deliver the combination of vent gas stream and oxidizing agents into the matrix bed of media.

According to another aspect of the invention, a diptube apparatus comprises a conduit for carrying vent gas stream at least partially positioned within the matrix bed. A vent gas stream plenum is positioned within the matrix bed and configured to receive vent gas stream from the vent gas stream conduit. The diptube apparatus further comprises an oxidizing agent conduit for delivering oxidizing agents into at least one mixing conduit. At least a portion of the mixing conduit is positioned within the vent gas stream plenum. The portion of the mixing conduit includes at least one aperture formed in a surface thereof, wherein vent gas stream from the vent gas stream plenum is delivered into the mixing conduit through the aperture. A combination of vent gas stream and oxidizing agents are delivered through the mixing conduit into the matrix bed of media of the flameless thermal oxidizer.

According to still another aspect of the invention, a flameless thermal oxidizer (FTO) is provided. The FTO comprises a vessel, a matrix bed of media contained within an interior of the vessel, and a diptube apparatus at least partially positioned within the matrix bed. The diptube apparatus includes a vent gas stream conduit for carrying vent gas stream that is at least partially positioned within the matrix bed, an oxidizing agent conduit for carrying oxidizing agents that is at least partially positioned within the matrix bed, and at least one mixing conduit that is at least partially positioned within the matrix bed that is configured to receive and combine vent gas stream from the vent gas stream conduit and oxidizing agents from the oxidizing agent conduit and to deliver the combination of vent gas stream and oxidizing agents into the matrix bed of media.

According to still another aspect of the invention, a method of delivering vent gas stream and oxidizing agents into the vessel includes the steps of distributing vent gas stream through the vent gas stream conduit; distributing oxidizing agents through the mixing conduit; and combining the vent gas stream and the oxidizing agent in a mixing conduit.

BRIEF DESCRIPTION OF THE DRAWINGS

The invention is best understood from the following detailed description when read in connection with the accompanying drawings. It is emphasized that, according to common practice, the various features of the drawings may not be to scale. The dimensions of the various features may be arbitrarily expanded or reduced for clarity. Included in the drawings are the following figures.

DETAILED DESCRIPTION OF THE INVENTION

The invention will next be illustrated with reference to the figures. Such figures are intended to be illustrative rather than limiting and are included herewith to facilitate explanation of the present invention. In the figures, like items numbers refer to like elements throughout.

Figure 1:
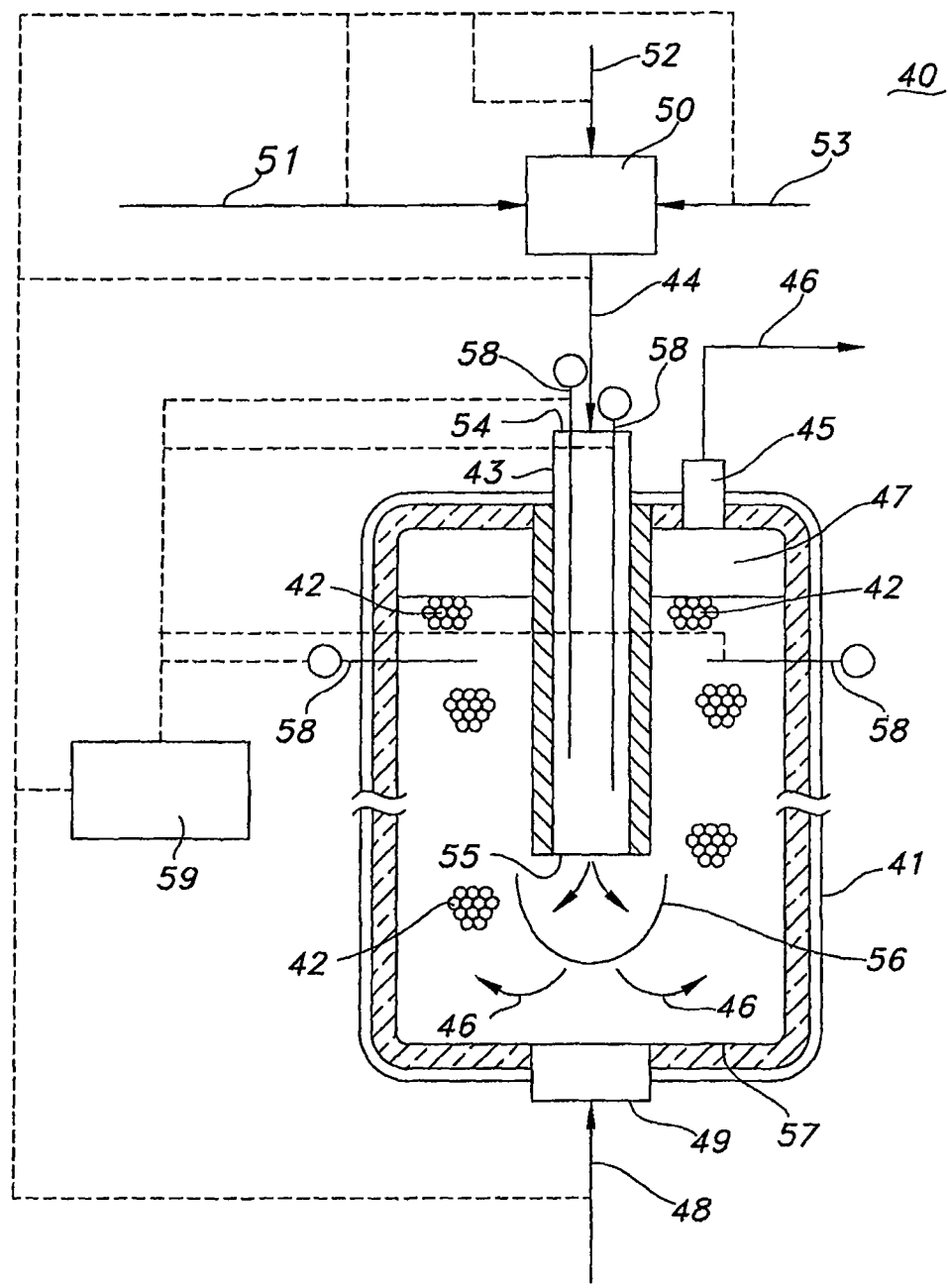
FIG. 1 is a schematic cross-sectional view of a nameless thermal oxidizer (FTO)

FIG. 1 depicts a flameless thermal oxidizer (FTO) 40 shown schematically. The FTO operates by thermally reacting a process gas stream 44 within a matrix bed of porous inert media (PIM). More specifically, the FTO 40 includes a vessel 41 filled with a matrix bed of PIM 42 (a small portion of the PIM matrix bed is illustrated). The PIM may be, for example, a packed bed of heat resistant material, such as ceramic balls or saddles. The matrix bed 42 is heated by introducing a heated medium 48 (for example, air or flue gases generated by a fuel gas burner or an electric resistance heater) through a heating inlet 49.

A reactable process gas stream 44 is delivered into the heated matrix bed 42 to facilitate an oxidation reaction. The reactable process gas stream 44 is formed by combining a fume stream 51 containing an oxidizable material, an oxidizing agent stream 52 (such as air or oxygen), and a supplementary fuel gas stream 53 in a mixing device 50. The oxidizing agent 52 and supplementary fuel 53 promote oxidation of the fume stream 51 in the matrix bed 42. After the reactable process gas stream 44 is formed, it is fed into a feed inlet 54 of the diptube 43. The diptube 43 is an open pipe of substantially constant inner and outer diameter, which extends at least partially within the PIM matrix bed 42, as shown. The feed inlet 54 is configured to receive the reactable process gas stream 44 and an outlet 55 of the diptube 43 is configured to deliver the reactable process gas stream 44 into the matrix bed 42.

The reactable process gas stream 44 is directed into a region of the PIM matrix bed 42 where the matrix bed temperature is sufficient to react the process stream to form at least one reaction wave 56. The chemicals in the process stream typically remain substantially unreacted until reaching the reaction wave 56, where a substantial portion of the chemicals are reacted over the wave length. Preferably, the non-planar reaction wave 56 is established entirely within the boundaries of the matrix bed. The reactable process gas stream 44 is reacted in the reaction wave 56 to produce the reacted process stream 46. The reacted process stream 46 is then directed through the matrix bed 42, through the void space 47 within the vessel 41, and out of the vessel through the exhaust outlet 45.

The location, stability, and size of the reaction wave 56 may be controlled through a programmable control system 59. FIG. 1 shows a control system 59 that uses the readings from temperature sensors 58 to adjust the flow rates of the fume stream 51, oxidizing agent stream 52, and supplementary fuel gas stream 53. For example, if the temperature declines in a specified location of the matrix bed 42, the control system 59 is configured to send a signal, such as an electrical or pneumatic signal, to a series of control valves (not shown) to increase the flow rate of supplemental fuel 53, or to decrease the flow rate of the oxidizing agent 52 added to the flameless thermal oxidizer in order to prevent migration of the wave 56 further away from the outlet 55 of the diptube 43. Conversely, if the temperature increases in the non-planar reaction wave to an undesirable level, the control system 59 is configured to send a signal to a control valve (not shown) to decrease the flow rate of supplemental fuel 53 or increase the flow rate of the oxidizing agent 52 added to the flameless thermal oxidizer in order to prevent the wave 56 from migrating into the inside of the diptube 43.

The control system 59 is also configured to adjust the flow rates of the fume stream 51, oxidizing agent stream 52, and supplementary fuel gas stream 53 in order to limit or prevent flashback. Flashback is a phenomena which occurs when the flame speed of a flammable mixture of an organic vapor and air is greater than the local velocity profile of the flammable mixture in the presence of an ignition source.

The FTO 40 is not generally intended for use with a flammable gas mixture because it does not include provisions to contain flashback. As described above, the FTO includes provisions, i.e., the programmable control system 59, for preventing flashback. In order to prevent flashback, the mixture of the process gas stream 51, oxidizing agent stream 52 and supplementary fuel gas stream 53 is typically maintained at least about five percentage points below the lower flammability limit and delivered into the matrix bed at a velocity that is slightly greater than the flame speed of the mixture.

Figure 2:
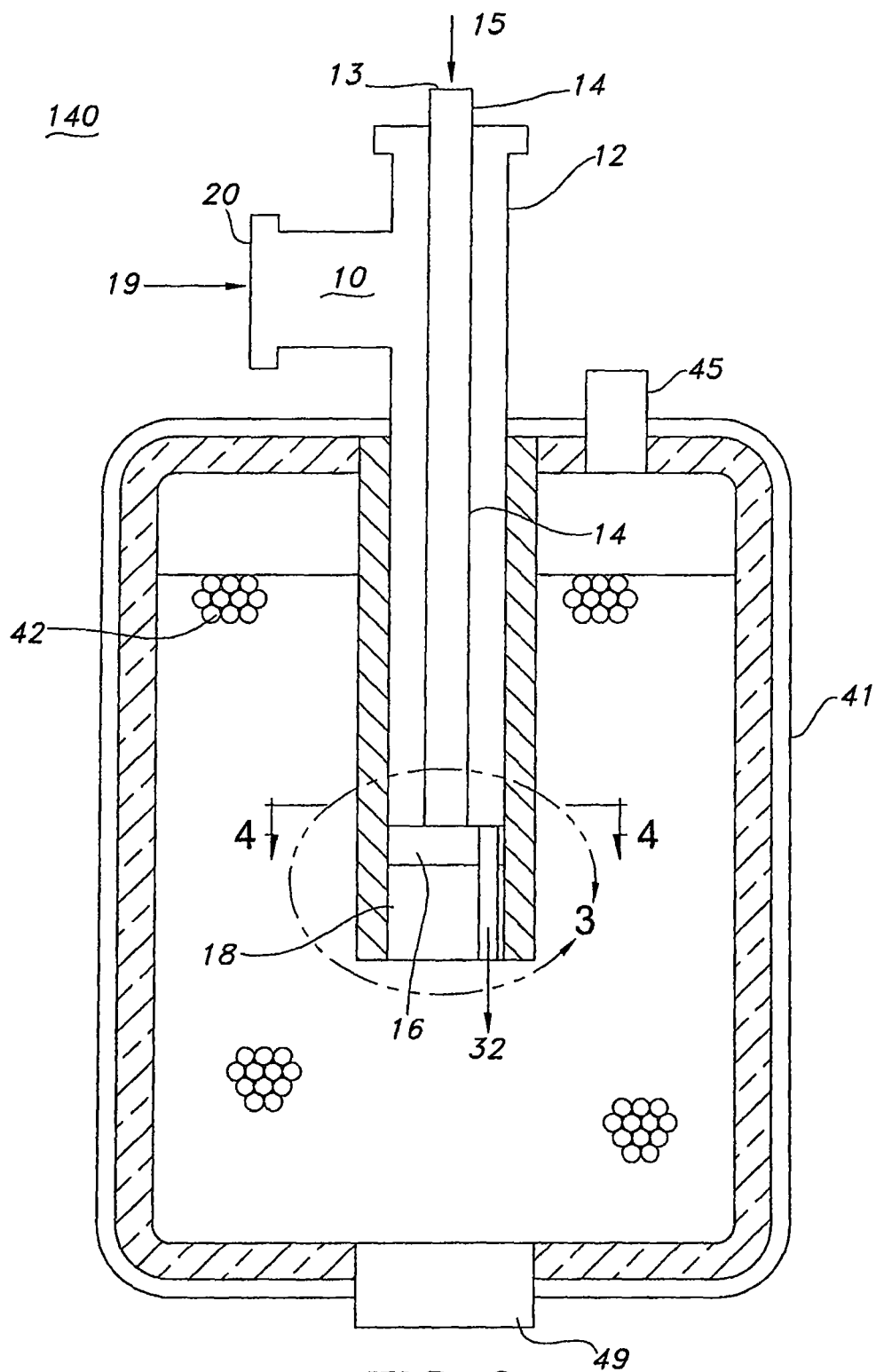
FIG. 2 is a schematic cross-sectional view of an FTO including a diptube apparatus according to an exemplary embodiment of the invention.

FIG. 2 depicts an exemplary embodiment of a flameless thermal oxidizer (FTO) 140 shown schematically according to aspects of the invention. The FTO 140 is similar to the FTO 40 shown in FIG. 1, however, the diptube 43 and mixing device 50 of FIG. 1 are replaced with a diptube apparatus 10. Similar to the diptube 43 of FIG. 1, the diptube apparatus 10 is positioned at least partially within a PIM matrix bed 42 contained within the FTO vessel 41. The diptube apparatus 10 may be sized to fit within the same space constraints of the FTO vessel 41 as the diptube 43 shown in FIG. 1.

According to an exemplary embodiment, the diptube apparatus 10 generally comprises an outer conduit 12, a vent gas stream conduit 14 positioned within the outer conduit 12, a vent gas stream plenum 16 positioned at the base of the vent gas stream conduit 14, and a plurality of mixing conduits 18 (one shown) extending through the vent gas stream plenum 16. Only one mixing conduit 18 is shown throughout the figures for the purpose of clarity.

As in the FTO 40, at times the heat generated by the combustion (oxidation) of the organic constituents contained as part of the vent gas stream 15 flow is not sufficient to raise the temperature of the process stream mixture 32 to a temperature sufficient to result to complete the oxidation reaction to meet regulatory emission requirements. Again, as in the FTO 40, auxiliary gaseous fuel may be added to the vent gas stream 15 to enhance the heating value. The introduction of auxiliary fuel can be done either external to or internal to conduit 14. The auxiliary gaseous fuel may comprise natural gas, propane or refinery gas, for example.

According to one exemplary use of the FTO 140, stream 19 comprising an oxidizing agent stream (e.g., oxygen or air) is introduced through an inlet 20 provided near the top end of outer conduit 12. The oxidizing agent stream 19 travels within the annular space defined between the outer conduit 12 and the vent gas stream conduit 14. The oxidizing agent stream 19 is ultimately distributed into the individual mixing conduits 18.

The vent gas stream 15 is introduced through an inlet 13 of the vent gas stream conduit 14. The vent gas stream 15 travels along the vent gas stream conduit 14 and is distributed into a vent gas stream plenum 16. The vent gas stream plenum 16 is essentially a hollow cylinder defining a closed cylindrical region, through which the plurality of mixing conduits 18 are positioned. The vent gas stream 15 and the oxidizing agent stream 19 are isolated until they are combined together within the interior of the mixing conduits 18 (one shown in FIG. 3 for clarity) to form reactable process gas stream 32, as best described in FIG. 5.

Figure 3:
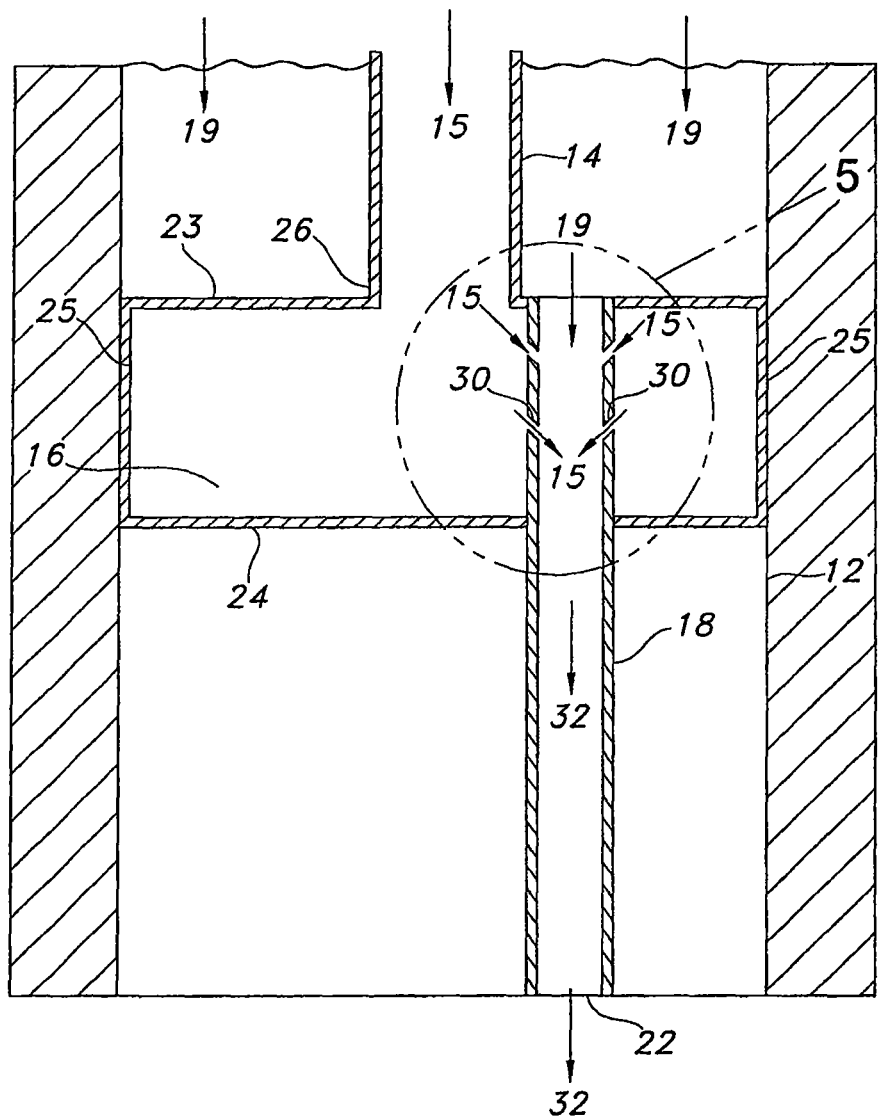
FIG. 3 is a detailed cross-sectional view of the diptube apparatus of FIG. 2.

FIG. 3 is a detailed view of the lower end of the diptube apparatus 10 cross-section shown in FIG. 2, according to an exemplary embodiment of the invention. FIG. 3 depicts a cross section of the outer conduit 12, vent gas stream conduit 14, vent gas stream plenum 16 and mixing conduits 18 (one shown for the purposes of clarity). The vent gas stream plenum 16 is mounted to the interior revolved surface of outer conduit 12. The vent gas stream plenum 16 may be welded, adhered or fastened, for example, to the interior surface of the outer conduit 12. The vent gas stream plenum 16 comprises an upper barrier 23, a lower barrier 24, and a cylindrical ring 25 interposed between the barriers 23 and 24. The components of the vent gas stream plenum 16 are optionally welded together.

The lower barrier 24 is a cylindrical disc having a series of holes formed therein for accommodating the mixing conduits 18, according to an exemplary embodiment of the invention. The mixing conduits 18 may be welded to the lower barrier 24 to limit escapement of the vent gas stream 15 through the lower barrier 24.

Figure 4:
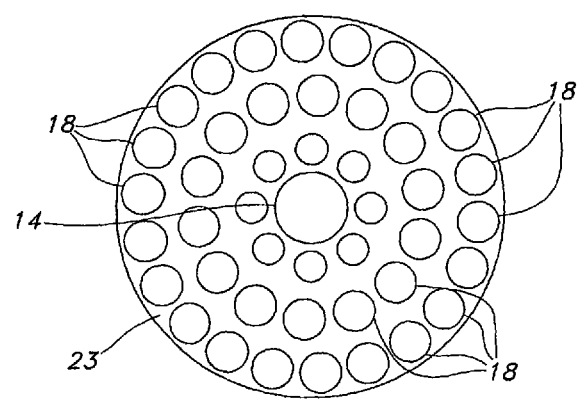
FIG. 4 is a top plan view of the diptube apparatus taken along the lines 4-4 of FIG. 2.

The upper barrier 23 is a cylindrical disc having a series of holes formed therein for accommodating the outlet end 26 of the vent gas stream conduit 14 and the inlet end of each mixing conduit 18, as best shown in FIGS. 3 and 4. FIG. 4 is a cross sectional view of the entire diptube apparatus 10 taken along the lines 4-4 of FIG. 2. The inlet end of each mixing conduit 18 is coupled to the upper barrier 23, and may be welded to the upper barrier 23 to limit or prevent introduction of the oxidizing agent stream 19 into the vent gas stream plenum 16. The outlet end 26 of the vent gas stream conduit 14 is also coupled to the upper barrier 23, and may be welded to the upper barrier 23 to limit introduction of the vent gas stream 15 into the annular space between the outer conduit 12 and the vent gas stream conduit 14. Alternatively, it may be desirous to permit some portion of vent gas stream 15 to mix into the annular space between the outer conduit 12 and the vent gas stream conduit 14.

Figure 5:
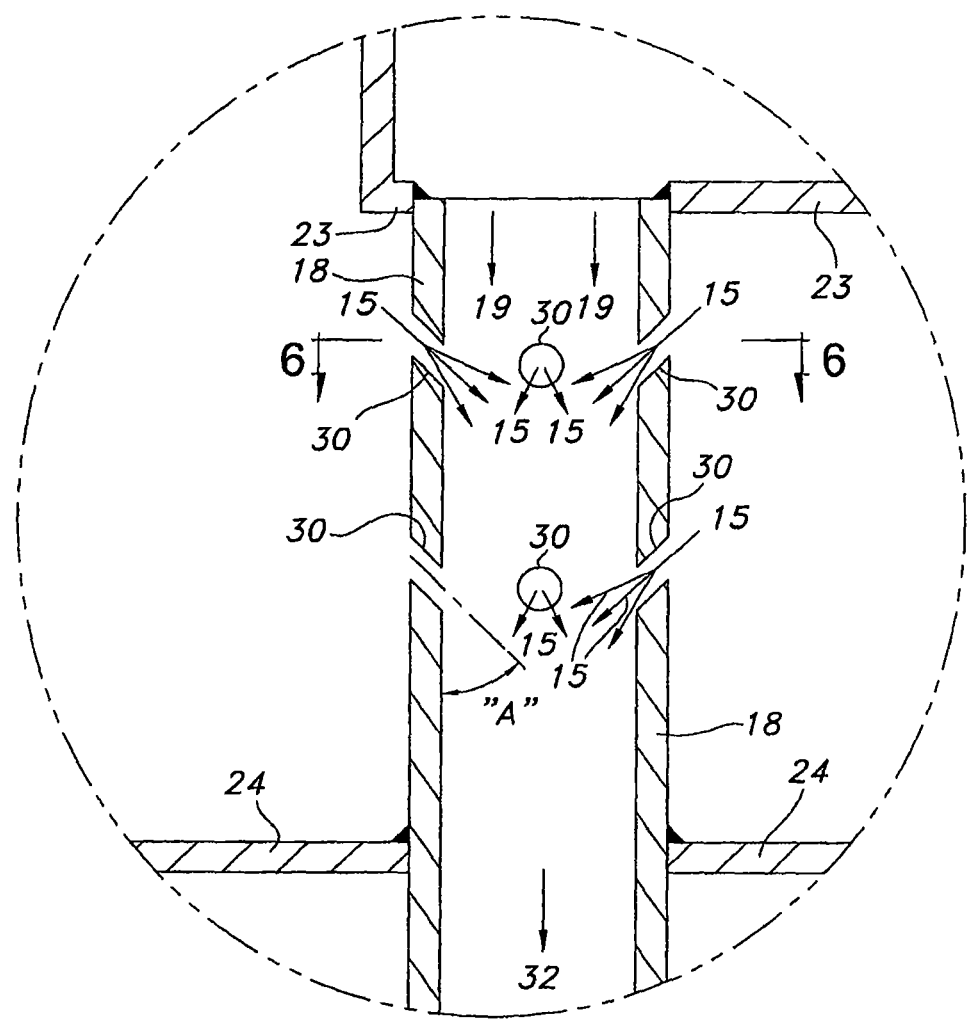
FIG. 5 is a detailed cross-sectional view of a mixing conduit of FIG. 3 according to an exemplary embodiment of the invention.

FIG. 5 depicts a detailed view of the mixing conduit 18 shown in FIG. 3. According to one exemplary use of the invention, the supplementary vent gas stream 15 travels along the length of vent gas stream conduit 14 and is distributed through the outlet end 26 of the fuel conduit 14 and into the vent gas stream plenum 16. As stated above, the outlet end 26 of the vent gas stream conduit 14 is mounted to a cylindrical opening provided in the upper barrier 23. The vent gas stream 15 collects in the vent gas stream plenum 16 and is ultimately distributed into the mixing conduits 18 through a series of openings or apertures 30 formed along the surface of the mixing conduits 18.

The apertures 30 are formed along the segment of each mixing conduit 18 that is disposed between the upper and lower barriers 23 and 24, such that the vent gas stream 15 within the vent gas stream plenum 16 circulates into the mixing conduits 18. As best shown in FIG. 5, the vent gas stream 15 is combined with the oxidizing agent stream 19 within the mixing conduits 18 to form reactable process gas stream 32. The reactable process gas stream 32 is ultimately delivered into the heated PIM matrix bed (not shown) through the outlet 22 of each mixing conduit 18.

The mixing conduits 18 are tailored to deliver the reactable process gas stream 32 into the PIM matrix bed with sufficient local velocity to limit or prevent a flashback. Flashbacks occur when the flame speed of a flammable mixture of vent gas stream and oxidizing agent is greater than the local velocity profile of the vent gas stream and oxidizing agent mixture in the presence of an ignition source. Accordingly, the potential for flashback is substantially reduced by increasing the local velocity profile of the vent gas stream and oxidizing agent mixture, and quickly distributing that mixture into the matrix bed.

Substantially increasing the velocity of the reactable process gas stream 32 reduces the residence time for a fully integrated mixture of the vent gas stream 15 and the oxidizing agent 19 within the mixing conduits 18, which diminishes the potential for uncontrolled deflagration due to inventory minimization of potentially combustible gases. By delivering the reactable process gas stream 32 into the matrix bed 42 at a velocity sufficiently greater than its flame speed, the mixture of the vent gas stream and the oxidizing agent may be maintained at or near the lower flammability limit of the mixture. Maintaining the mixture of the vent gas stream and the oxidizing agent at or near the lower flammability limit of the mixture minimizes FTO operational costs and maximizes the available capacity of the FTO vessel.

To meet those objectives, the number, position, cross-sectional area and length of the mixing conduits 18, individually or in combination, are tailored to deliver the reactable process gas stream 32 into the PIM matrix bed with sufficient local velocity to limit or prevent a flashback.

According to one exemplary embodiment, the collective cross-sectional area of the mixing conduits 18 is less than both the cross-sectional area of the vent gas stream conduit 14 and the effective cross-sectional area of the outer conduit 12. Constricting the flow path of the oxidizing agent stream 19 through the mixing conduits 18 increases its local velocity, such that the local velocity of the oxidizing agent stream 19 (as it forms reactable process gas stream 32) is over the entire flow range of stream 32 from high to low greater than its flame speed.

According to the exemplary embodiment, the collective cross-sectional area of the mixing conduits 18 is the sum of the interior cross-sectional areas of all of the mixing conduits 18. The effective cross-sectional area of the outer conduit 12 is the difference between the interior cross-sectional area of the outer conduit 12 and the outer cross-sectional area of the vent gas stream conduit 14, because the oxidizing agent stream 19 flows in the annular area defined between the outer conduit 12 and the vent gas stream conduit 14.

According to the exemplary embodiment, the inner diameter of each mixing conduit 18 may be from about 0.5 to about 3 inches, for example. The diptube apparatus 10 may include a plurality of mixing conduits 18, such as, for example, forty-two (42) mixing conduits 18. The inner diameter of the outer conduit 12 may be from about 6 to about 60 inches, for example. The inner diameter of the vent gas stream conduit 14 that is positioned within the outer conduit may be from about 1 inch to about 6 inches, for example. A ratio of the effective cross-sectional area of the outer conduit 12 to the collective cross-sectional area of the mixing conduits 18 is between about 2.5:1 and 6:1.

The velocity of the reactable process gas stream 32 increases as it travels through each mixing conduit 18. The velocity of the reactable process gas stream 32 may be between about 50 feet/second to about 250 ft/second as it travels through each mixing conduit 18.

According to one exemplary embodiment, the distance separating the outlet of each mixing conduit 18 and the PIM of the matrix bed 42 is also maintained at a minimum to limit or prevent substantial deceleration of the reactable process gas stream 32 upon exiting the mixing conduit 18, but prior to reaching the PIM matrix bed 42. The outlet of each mixing conduit 18 may be positioned within the matrix bed 42, if so desired.

Because the reactable process gas stream 32 is delivered directly into the matrix bed 42 through the mixing conduits 18 at a local velocity greater than its flame speed, the equivalence ratio, Ø, of the actual organic vapor flow (F) to oxidizer flow (A) over the stoichiometric organic vapor flow to oxidizer flow in the reactable process gas stream 32 may be maintained between a range of about 0.5:1 to about 0.8:1, which is within the flammability limits for most organic vapor/air mixtures. Specifically, each mixing conduit 18 is configured to premix the vent gas stream 15 and the oxidizing agent stream 19 (containing air) at an equivalence ratio of between a range of about 0.5:1 to about 0.8:1. Ø=F/A (actual)/F/A (stoichiometric).

For the purpose of comparison, the equivalence ratio in a FTO, such as the FTO shown in FIG. 1, is maintained at about 0.35:1, which is well below the lower flammability limit for organic vapor mixtures. As stated previously, the equivalence ratio is maintained below the lower flammability limit in a FTO to prevent or reduce the risk of flashback in addition to other operational benefits. More particularly, because the oxidizing agent stream and vent gas stream are combined at either the inlet end of a diptube or in a mixing device (e.g. item 50 of FIG. 1) in a FTO, flashback could potentially occur if the mixture of the vent gas stream and the oxidizing agent was maintained equal to or greater than its lower flammability limit. For that reason, in FTO's the mixture of vent gas and oxidizing agent is maintained at least about five percentage points below its lower flammability limit to prevent flashback.

Maintaining the mixture of vent gas and oxidizing agent at least about five percentage points below its lower flammability limit may facilitate excessive fuel consumption and overly conservative vessel sizing criteria. More particularly, less supplemental fuel is required to oxidize a process stream 32 having an equivalence ratio greater than the lower flammability limit (i.e., 0.4:1) because less dilution air is required to maintain a low equivalence ratio. Thus, the cost of fuel consumed by the FTO 140 is significantly lower than that of a FTO, which is directly attributable to the diptube apparatus 10 of the FTO 140.

Figure 6A:
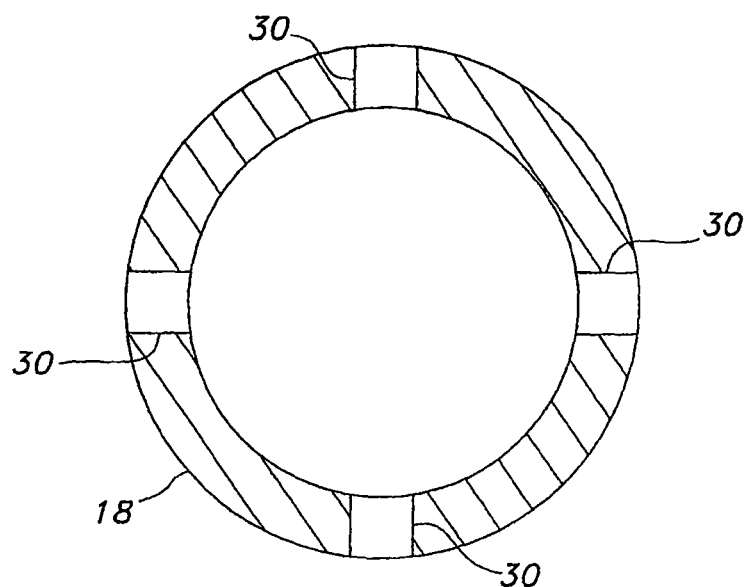
FIG. 6A is a detailed cross-sectional view of the mixing conduit of FIG. 5 taken along the lines 6-6.
Figure 6B:
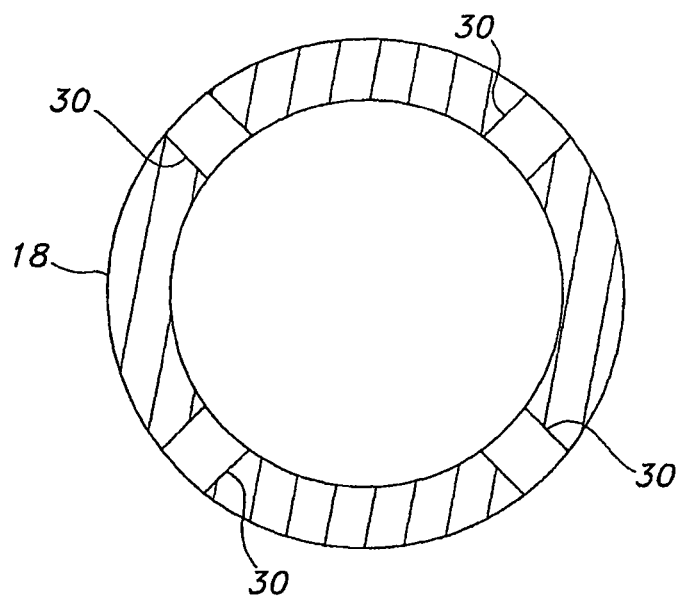
FIG. 6B is another detailed cross-sectional view of a mixing conduit like that shown in FIG. 6A according to another exemplary embodiment of the invention, wherein the apertures of the mixing tube are disposed at alternate positions.

Referring now to FIG. 6B, each mixing conduit 18 includes a series of apertures 30 for distributing the vent gas stream 15 with the oxidizing agent stream 19 (containing air) at greater equivalence ratios than about 0.4:1. According to one exemplary embodiment, each mixing conduit 18 optionally includes two rows of four apertures 30. A detailed view of the top row of apertures 30 is shown in FIG. 6A. The top and bottom rows each optionally include four apertures positioned at 0°, 90°, 180°, and 270°, as shown in FIG. 6A. The adjacent apertures 30 are separated by 90° to promote uniform distribution of the vent gas stream 15 within each mixing tube 18.

In another exemplary embodiment of the mixing tube shown in FIG. 6B, the apertures are positioned at 45°, 135°, 225°, and 315°. To promote uniform distribution of the vent gas stream 15 within each mixing tube 18, the top row of apertures may be positioned at 0°, 90°, 180°, and 270°, and the bottom row of apertures may be positioned at 45°, 135°, 225°, and 315°, respectively. In such an exemplary embodiment, the adjacent apertures 30 of both the top and bottom rows are separated by ninety degrees with respect to each other, and the apertures of the top row are separated by 45 degrees from the nearest apertures 30 of the bottom row. It should be understood that the mixing conduits 18 may incorporate any number of apertures 30. Moreover, the apertures 30 may be positioned at any angle with respect to each other to serve any specific purpose.

Referring back to FIG. 5, each aperture 30 is disposed through the wall of the mixing tube at an angle "A." The angle "A" may be approximately 45°, for example. The apertures 30 are positioned at angle "A" to direct the vent gas stream 15 toward the outlet 22 of the mixing tube 18. The diameter of the aperture 30 is inversely proportional to the velocity of the fuel stream within the mixing tube 18, i.e., the velocity of the vent gas stream distributed through the aperture 30 increases as the diameter of the aperture decreases, and vice versa. The diameter of each aperture 30 also impacts the required equivalence ratio and total heat input. The aperture size may vary widely. By way of non-limiting example, the diameter of each aperture 30 may range from about 0.02 inches to about 0.25 inches.

While exemplary embodiments of the invention have been shown and described herein, it will be understood that such embodiments are provided by way of example only. Numerous variations, changes and substitutions will occur to those skilled in the art without departing from the spirit of the invention. For example, the vent gas stream 15 may be distributed through the inlet of each mixing conduit 18 and the oxidizing agent stream 19 may be distributed into the apertures 30 of each mixing conduit 18 to achieve a similar effect. Moreover, in lieu of the fuel plenum 16, the supplementary vent gas stream 15 may be directly distributed into the mixing conduits 18 through a series of injectors, tubes or conduits (not shown) to achieve a similar effect. Also, the vent gas stream 15 may be distributed directly into the vent gas stream plenum 16 and the vent gas stream conduit 14 may be omitted. It should be also understood that the conduits 12, 14, and 18 are not limited to a circular cross-sectional shape, as other cross-sectional shapes are envisioned, such as square, rectangular, and so forth.

Accordingly, it is intended that the appended claims cover all such variations as fall within the spirit and scope of the invention.

What is claimed is:

1. A diptube apparatus for a flameless thermal oxidizer having a matrix bed of media comprising:
   a vent gas stream conduit at least partially positioned within the matrix bed for delivering a vent gas stream;
   an oxidizing agent conduit separate from the vent gas stream conduit and at least partially positioned within the matrix bed for delivering oxidizing agents;
   a plurality of mixing conduits positioned within the matrix bed, each mixing conduit comprising a tube having (i) a first open end for receiving the oxidizing agents from the oxidizing agent conduit, (ii) at least one aperture disposed along the length of the mixing conduit for receiving the vent gas stream from within the vent gas stream conduit, and (iii) a second open end opposite the first open end for delivering a combination of the vent gas stream and the oxidizing agents into the matrix bed.

2. The diptube apparatus of claim 1 further comprising a plenum, wherein said vent gas stream conduit is positioned to deliver the vent gas stream into said plenum.

3. The diptube apparatus of claim 2 wherein at least a portion of each mixing conduit is positioned within said plenum.

4. The diptube apparatus of claim 3, wherein, for each mixing conduit, the at least one aperture is formed in said at least a portion of the mixing conduit that is positioned within said plenum, wherein the vent gas stream from the plenum is delivered through said aperture into an interior region of said mixing conduit.

5. The diptube apparatus of claim 4 wherein each mixing conduit comprises a plurality of apertures positioned to distribute the vent gas stream from said plenum into the interior region.

6. The diptube apparatus of claim 1 wherein each mixing conduit mixes the vent gas stream and the oxidizing agents at an oxidizing agent to vent gas stream equivalence ratio of between 0.5:1 to 0.8:1.

7. The diptube apparatus of claim 1 wherein the each mixing conduit mixes the vent gas stream and the oxidizing agents at an oxidizing agent to vent gas stream equivalence ratio in a range of between 0.09:1 to 4:1.

8. The diptube apparatus of claim 1, wherein a ratio of a cross-sectional area of the oxidizing agent conduit to a collective cross-sectional area of the plurality of mixing conduits is between 2.5:1 to 6:1.

9. The diptube apparatus of claim 1 wherein the second open end of the each mixing conduit comprises an outlet, said outlet positioned adjacent to the matrix bed to deliver the combination of the vent gas stream and the oxidizing agents directly into the matrix bed.

10. The diptube apparatus of claim 1, wherein each mixing conduit is oriented in a vertical direction and parallel to the vent gas stream conduit and the oxidizing agent conduit.

11. A diptube apparatus for a flameless thermal oxidizer having a matrix bed of media comprising:
 a vent gas stream conduit for carrying a vent gas stream for reduction of volatile organic contamination (VOC), said vent gas stream conduit at least partially positioned within the matrix bed;
 a plenum positioned within the matrix bed and being constructed to receive said vent gas stream from the vent gas stream conduit;
 an oxidizing agent conduit separate from the vent gas stream conduit and at least partially positioned within the matrix bed for delivering oxidizing agents;
 a plurality of mixing conduits, each mixing conduit comprising a tube having a portion that is positioned within said plenum, a first open end for receiving the oxidizing agents from the oxidizing agent conduit, at least one aperture disposed in a surface of said portion of the mixing conduit for receiving the vent gas stream from within the plenum, and a second open end opposite the first open end for delivering a combination of the vent gas stream and the oxidizing agents into the matrix bed of media.

12. The diptube apparatus of claim 11 wherein, for each mixing conduit, said second open end comprises an outlet positioned adjacent to the matrix bed to deliver the combination of the vent gas stream and the oxidizing agents directly into the matrix bed.

13. The diptube apparatus of claim 11 wherein each mixing conduit comprises two rows of apertures positioned to evenly and uniformly distribute the vent gas stream into an interior of the respective mixing conduit.

14. The diptube apparatus of claim 11 wherein said vent gas stream conduit is positioned within said oxidizing agent conduit.

15. The diptube apparatus of claim 11 wherein the vent gas stream is delivered into the mixing conduits through said oxidizing agent conduit.

16. The diptube apparatus of claim 11, wherein each mixing conduit is oriented in a vertical direction and parallel to the vent gas stream conduit and the oxidizing agent conduit.

* * * * *